US009781051B2

(12) United States Patent
Bertram et al.

(10) Patent No.: US 9,781,051 B2
(45) Date of Patent: *Oct. 3, 2017

(54) MANAGING INFORMATION TECHNOLOGY RESOURCES USING METADATA TAGS

(71) Applicant: International Business Machines Corporation, Armonk, NY (US)

(72) Inventors: Randal L. Bertram, Raleigh, NC (US); Gregory R. Hintermeister, Rochester, MN (US); David M. S. Niedergeses, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 171 days.

This patent is subject to a terminal disclaimer.

(21) Appl. No.: 14/287,315

(22) Filed: May 27, 2014

(65) Prior Publication Data
US 2015/0350035 A1    Dec. 3, 2015

(51) Int. Cl.
*H04L 12/911* (2013.01)
*H04L 12/24* (2006.01)
(Continued)

(52) U.S. Cl.
CPC ............ *H04L 47/70* (2013.01); *G06F 9/5061* (2013.01); *H04L 41/5054* (2013.01);
(Continued)

(58) Field of Classification Search
CPC ......... H04L 47/70; H04L 67/10; H04L 41/50; H04L 41/5041; H04L 67/1097;
(Continued)

(56) References Cited

U.S. PATENT DOCUMENTS

2005/0120160 A1* 6/2005 Plouffe ............... G06F 9/45537
711/1
2007/0043860 A1* 2/2007 Pabari ................... G06F 9/5072
709/224

(Continued)

OTHER PUBLICATIONS

Ran Jian-Hua et al., "Study on Management and Dispatching of Virtual Computing Resources Based on Pool Theory," 2011 7th International Conference on Wireless Communications, Networking and Mobile Computing (WiCOM), pp. 1-7, IEEE, 2011, Piscataway, United States.

(Continued)

*Primary Examiner* — David Lazaro
*Assistant Examiner* — Berhanu Shitayewoldetsad
(74) *Attorney, Agent, or Firm* — Patterson + Sheridan, LLP

(57) ABSTRACT

A resource manager is tasked with monitoring and managing information technology (IT) resources in a virtual environment. The IT resources are assigned tags that correspond to conditions that alert the resource manager when to begin actively managing the IT resource. The resource manager may monitor events occurring in the virtual environment that have conditions that match the predefined tags. When such an event occurs, the resource manager identifies an appropriate resource by searching a data store that includes the tags and the corresponding resource. The resource manager then begins to actively manage the resource and assigns the resource to a workload. By tagging the resources, the resource manager does not need to actively manage all of the IT resource in the virtual environment. Furthermore, the tags permit the resource manager to automatically select which resources to actively manage without receiving instructions from a system administrator.

13 Claims, 5 Drawing Sheets

(51) Int. Cl.
*H04L 29/08* (2006.01)
*G06F 9/50* (2006.01)

(52) U.S. Cl.
CPC .......... *H04L 67/10* (2013.01); *H04L 67/2809* (2013.01); *H04L 41/5096* (2013.01)

(58) Field of Classification Search
CPC ............. H04L 41/0806; H04L 41/5045; H04L 41/5054; H04L 41/5096; H04L 47/783; H04L 67/1002; H04L 12/4641; H04L 29/08144
USPC .................................................. 709/226–232
See application file for complete search history.

(56) References Cited

U.S. PATENT DOCUMENTS

| | | | |
|---|---|---|---|
| 2007/0180451 | A1 | 8/2007 | Ryan et al. |
| 2010/0005471 | A1* | 1/2010 | Jethani .................. G06F 11/079 718/104 |
| 2010/0125844 | A1* | 5/2010 | Mousseau ................. G06F 9/50 718/1 |
| 2010/0146015 | A1* | 6/2010 | Milic-Frayling . G06F 17/30115 707/812 |
| 2010/0306377 | A1* | 12/2010 | DeHaan ................ G06F 9/5077 709/226 |
| 2011/0055588 | A1* | 3/2011 | DeHaan ................ G06F 1/3209 713/189 |
| 2011/0083131 | A1* | 4/2011 | Pirzada ............... G06F 9/45533 718/1 |
| 2011/0125894 | A1* | 5/2011 | Anderson ............. H04L 9/3213 709/224 |
| 2011/0126197 | A1* | 5/2011 | Larsen .................. H04L 9/3213 718/1 |
| 2011/0307291 | A1* | 12/2011 | Rolia ..................... G06Q 10/06 705/7.25 |
| 2012/0185848 | A1* | 7/2012 | Devarakonda ...... G06F 9/45533 718/1 |
| 2012/0331477 | A1* | 12/2012 | Zeighami ............ H04L 41/0893 718/104 |
| 2013/0097651 | A1 | 4/2013 | Rendahl et al. |
| 2013/0238785 | A1 | 9/2013 | Hawk et al. |
| 2014/0019972 | A1* | 1/2014 | Yahalom ............. H04L 67/1097 718/1 |
| 2015/0350103 | A1 | 12/2015 | Bertram et al. |

OTHER PUBLICATIONS

Gideon Juve et al., "Automating Application Deployment in Infrastructure Clouds," 2011 IEEE Third International Conference on Cloud Computing Technology and Science (CloudCom), pp. 658-665, IEEE, Piscataway, United States.

Trieu C. Chieu et al., "A Cloud Provisioning System for Deploying Complex Application Services," 2010 IEEE 7th International Conference on e-Business Engineering (ICEBE), pp. 125-131, IEEE, Piscataway, United States.

Terence Harmer et al., "An Application-Centric Model for Cloud Management," 2010 6th World Congress on Services (Services-1), pp. 439-446, IEEE, Piscataway, United States.

\* cited by examiner

SCAN AND ADD

VIRTUALIZATION / HARDWARE MANAGERS

| NAME | TYPE | METADATA TAGS |
|---|---|---|
| PVC1.IBM.COM | VC | US; MAINTENANCE |
| PVC2.IBM.COM | VC | UK; PEAKTIME |
| PHC1.IBM.COM | HC | US |

⌐ 305

HARDWARE RESOURCES

| NAME | TYPE | CATEGORY | METADATA TAGS |
|---|---|---|---|
| PNODE1 | POWER 7 | COMPUTE | US; ERROR BACKUP |
| PNODE2 | POWER 7 | COMPUTE | x86 PLATFORM |
| VCONTROLLER | V 700 | STORAGE | UK; PEAK TIME |

⌐ 310

*FIG. 3*

MANAGING INFORMATION TECHNOLOGY RESOURCES USING METADATA TAGS

BACKGROUND

The present invention relates to managing resources in a virtual environment, and more specifically, to tagging the resources to enable automatic allocation.

Virtual environments such a cloud computing environments, software-defined environments, and other similar distributed computing schemes typically include thousands of different information technology (IT) resources. The different resources are assigned to workloads and used to perform the tasks issued by the workload. For example, a customer may be assigned a portion of the IT resources in the virtual environment which provide the necessary compute resources to satisfy the tasks provided by the customer's workload.

These IT resources are typically organized and maintained using a resource manager. Thus, every time a new IT resource is added to the virtual environment, the resource manager is required to track and monitor the resource. As such, the overhead of the resource manager scales with the number of IT resources in the virtual environment. The resource manager itself requires compute resources in order to manage all the hardware resources in the virtual environment. As the virtual environment grows, the resource manager requires additional computing resources which drive up the cost of operating the virtual environment.

SUMMARY

One embodiment of the present disclosure is a method for assigning one or more resources based on an event occurring in a virtual environment. The method includes identifying a predefined tag that satisfies a condition associated with the event and searching a data store to identify one or more resources assigned the predefined tag where the data store includes a plurality of resources that are each assigned at least one predefined tag and are not currently being actively managed by a resource manager of the virtual environment. After identifying the resource, the method includes actively managing the one or more resource using the resource manager. The method also includes assigning the one or more resources to a workload in the virtual environment associated with the event.

Another embodiment of the present disclosure is a system that includes a computer processor and a memory containing a program that, when executed on the computer processor, performs an operation for assigning one or more resources based on an event occurring in a virtual environment. The operation includes identifying a predefined tag that satisfies a condition associated with the event and searching a data store to identify one or more resources assigned the predefined tag where the data store includes a plurality of resources that are each assigned at least one predefined tag and are not currently being actively managed by a resource manager of the virtual environment. After identifying the resource, the operation includes actively managing the one or more resource using the resource manager. The operation also includes assigning the one or more resources to a workload in the virtual environment associated with the event.

Another embodiment of the present disclosure is computer program product for assigning one or more resources based on an event occurring in a virtual environment. The computer program product includes a computer-readable storage medium having computer-readable program code configured to identify a predefined tag that satisfies a condition associated with the event and search a data store to identify one or more resources assigned the predefined tag where the data store includes a plurality of resources that are each assigned at least one predefined tag and are not currently being actively managed by a resource manager of the virtual environment. After identifying the resource, computer-readable program code is configured to actively manage the one or more resource using the resource manager. The computer-readable program code is also configured to assign the one or more resources to a workload in the virtual environment associated with the event.

BRIEF DESCRIPTION OF THE SEVERAL VIEWS OF THE DRAWINGS

FIG. 3 illustrates a graphical user interface for tagging resources, according to one embodiment described herein.

Figure 1:
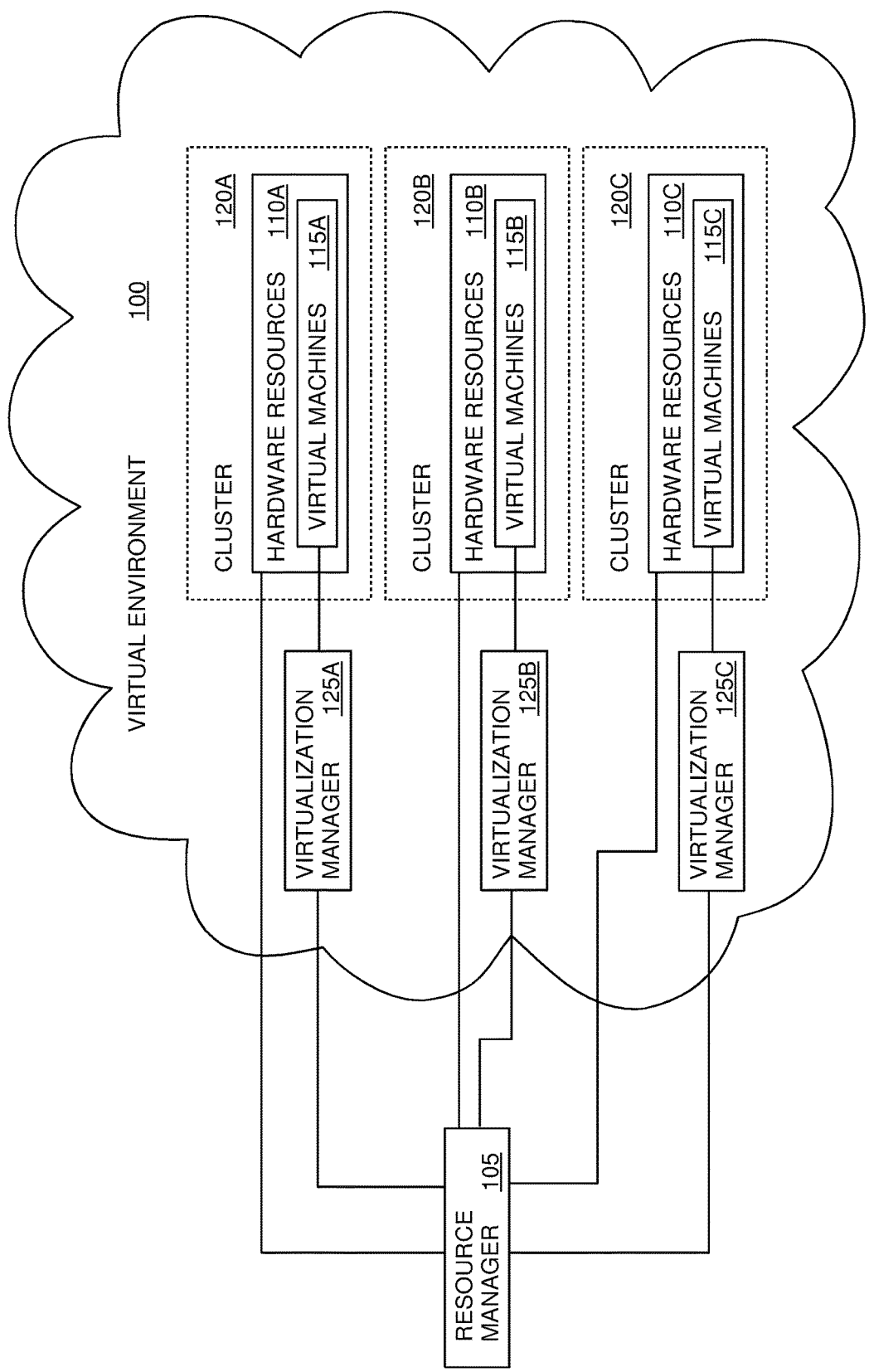
FIG. 1 illustrates a virtual environment with various types of IT resources managed by a resource manager, according to one embodiment described herein.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

A system administrator uses the resource manager to monitor the IT resources in a virtual environment. As described above, as the number of resources in the virtual environment increases, so does the overhead of the resource manager. Moreover, when there is a change in demand in the virtual environment, the system administrator may reassign the resources. For example, if a particular workload is underutilizing its assigned resources, the system administrator may reassign the resources to another workload.

The embodiments described herein disclose a programmatic resource manager that automatically identifies and assigns resources to a workload without intervention from the system administrator. To do so, the resource manager may maintain a data store that stores metadata tags associated with each resource. When a new resource is added to the virtual environment, the resource manager assigns one or more tags to the resource. This assignment is then stored in the data store. In addition, each tag is associated with a condition or a combination of conditions that describe an event or a state of the virtual environment. When a particular event occurs in the virtual environment such as maintenance, a resource fails, a resource is underutilized/over-utilized, and the like, the resource manager searches the data store to determine if there is a tag that corresponds to the conditions describing the event. For example, a resource may be tagged with "MAINTENANCE" which corresponds to an event where maintenance is performed on a hardware resource. Using the data store, the resource manager determines which resources have the identified tag. Once found, the resource manager can begin to manage the resource and allocate it to a workload associated with the event. In this manner, after the system administrator tags the added resources, the resource manager can automatically identify and respond to the events without further intervention from the system administrator.

In one embodiment, the resource manager does not actively manage some or all of the tagged resources stored in the data store. Doing so means that the overhead on the resource manager is reduced. For example, a thousand resources may be tagged in the data store but the resource manager may actively manage only five hundred of the resources. Once the resource manager identifies a resource with a metadata tag that corresponds to a recent event, if that resource is not being actively managed, the resource manager begins to manage the resource and assigns it to the appropriate workload. For example, the data store may include tagged resources that are not currently being used, are underutilized, or are used by other virtual environments. However, after identifying a need for the resource, the resource manager begins to actively manage the resource so that the resource can be consumed—i.e., assigned to a workload.

FIG. 1 illustrates a virtual environment 100 with IT resources managed by a resource manager 105, according to one embodiment described herein. The virtual environment 100 can be any distributed computing system such as a cloud environment or a software-defined environment. The resource manager 105 is tasked with managing and/or monitoring the IT resources in the virtual environment 100. For example, a system administrator may use the resource manager 105 to add new IT resources, assign the resources to a workload, move the resources to different workloads, remove the resources from the virtual environment 100, and the like.

Different types of IT resources include hardware resources 110, hardware managers, virtualization manager 125, and the like. Generally, the IT resources provide the necessary compute resources to perform the tasks generated by a workload. In one embodiment, the IT resources exclude networking resources in the virtual environment 100 such as routers, switches, hubs, and the like. The networking resources, which provide connectivity between the various IT resources shown in FIG. 1, may be managed by a network manager (not shown) instead of the resource manager 105.

The hardware resources 110 include compute resources such as servers (e.g., blade servers, tower server, rack server, etc.) or storage (e.g., hard disk drives, magnetic tape, etc.). As shown, the hardware resources 110 are used to generate respective virtual machines 115. For example, each server may execute one or more virtual machines 115. Each virtual machine 115 is an independent software-based emulation of a physical computer. If a server hosts a plurality of virtual machines 115, the machines 115 share the physical computing resources of the server. A hypervisor may be used as an intermediary between the virtual machines 115 and the physical computing components of the hardware resource 110.

As shown, the hardware resources 110 and/or the virtual machines 115 are organized into clusters 120. The virtual machines 115 in each of the clusters 120 are coupled to a respective virtualization manager 125 which monitors and manages the specific virtual machines 115 in that cluster 120. For example, virtualization manager 125A is in charge of managing the virtual machines 115A in cluster 120A. As such, the virtualization manager 125A may generate additional virtual machines 115A using the hardware resources 110A, deactivate a virtual machine 115A, move virtual machines 115A to different hardware resources 110A in cluster 120A, and the like. Although not shown, the virtual environment 100 may include a hardware manager that manages the hardware resources 110 in a cluster 120. For example, the hardware manager may be assigned to manage all the servers and storage elements in a particular rack or plurality of racks in a data center. The clusters 120 may be used to group hardware resources 110 or virtual machines 115 that have shared similarities. For example, the hardware resources may have the same geographic location (e.g., all in the same rack) or include similar hardware elements (e.g., top-of-the-line processors). Similarly, the virtual machines 115 may inherit traits from the hardware elements on which they execute (e.g., shared geographic location or execute using top-of-the-line processors) as well has having other possible shared traits such as similar amounts of virtual memory, operating systems, instruction set architectures, and the like.

In addition to monitoring the hardware resources 110, the resource manager 105 can also monitor the virtualization mangers 125 and hardware managers. This permits the resource manager 105 to make changes to a cluster 120 rather than to each individual hardware resource 110 or virtual machine 115. For example, the resource manager 105 may receive updates from the virtualization manager 125A rather than having to communicate with the different virtual machines 115A individually. Thus, by organizing the virtual environment into clusters 120, the resource manager can communicate with virtualization or hardware managers that, in turn, manage the hardware resources 110 and virtual machines 115. As such, the virtualization managers 125 and hardware managers are also considered IT resources that can be managed by the resource manager 105.

Figure 2:
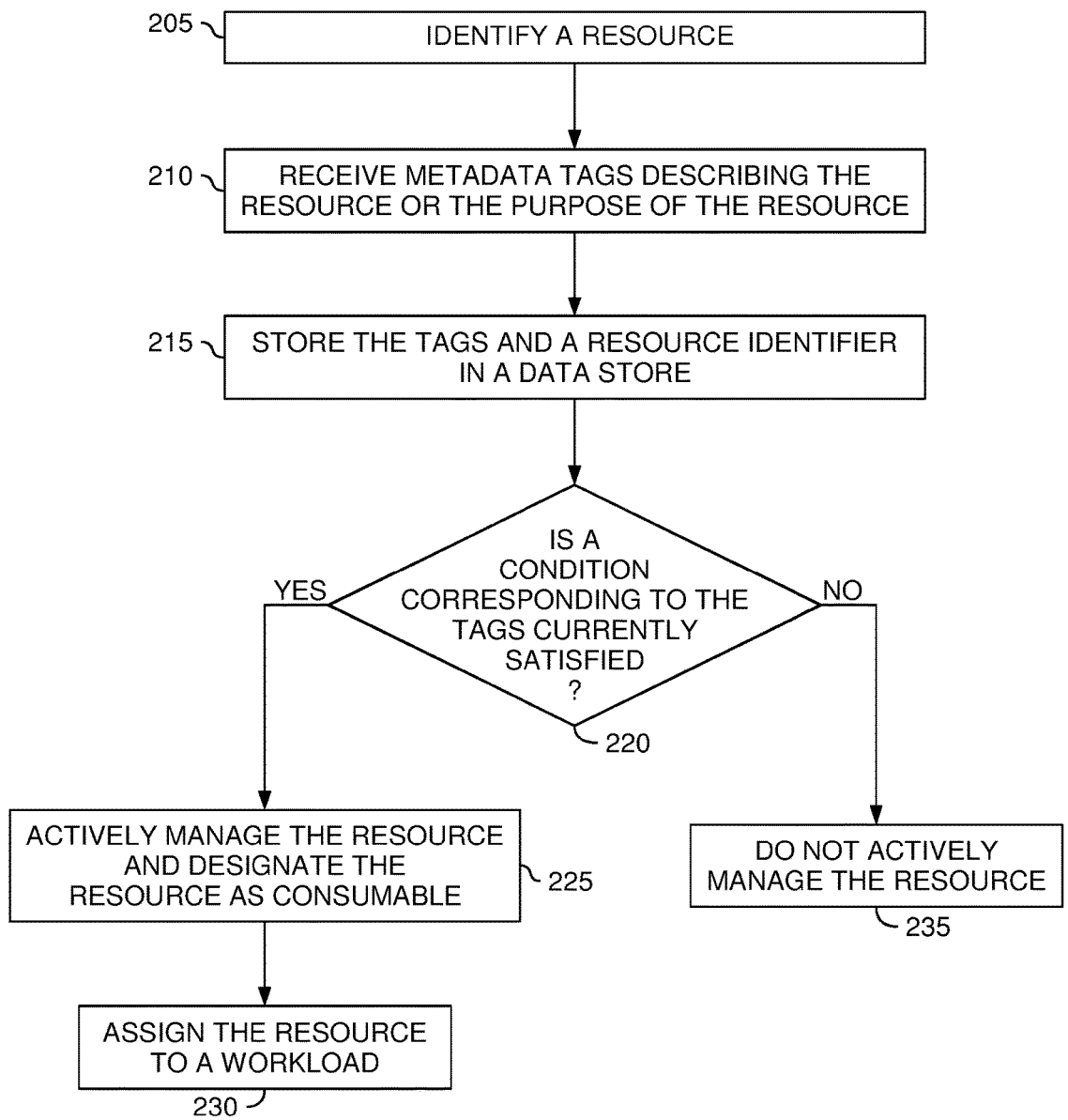
FIG. 2 illustrates a flowchart for tagging resources added to a data store associated with the resource manager, according to one embodiment described herein.

FIG. 2 illustrates a flowchart 200 for tagging resources added to a data store associated with the resource manager, according to one embodiment described herein. Flowchart 200 begins at block 205 when an IT resource is identified to a resource manager. This may be done by a system administrator physically providing a resource name and identification to the resource manager or by the resource manager performing a scan. As an example of the latter, the resource manager may periodically scan the virtual environment to determine if there are any new resources. During block 205, the resource manager may also collect management information that permits the manager to actively manage the new resource such as IP address, sign-on information, management credentials, the location of the resource, and the like.

At block 210, the resource manager receives one or more metadata tags describing the resource or the purpose of the resource. In one embodiment, the system administrator provides the tags to the resource manager. Alternatively, the resource manager may include logic for automatically assigning the tags. For example, the resource manager may determine a tag to apply to the resource based on the management information such as the resource's location. Additionally, the resource manager may know the specs of the resource such as the type of processor or memory in the resource (if a hardware resource) or the type of operating system the resource executes. Based on this information, the resource manager may assign a tag to the resource.

Each tag may correspond to one or more predefined activation condition which is used to determine if a resource assigned the tag should be actively managed by the resource manager. Table 1 provides a non-exhaustive lists of tags and corresponding activation conditions.

TABLE 1

| Metadata Tag | Activation Condition |
| --- | --- |
| Always | Continuously manage the tagged resource |
| Maintenance | Actively manage the tagged resource when a maintenance operation is performed |
| Tier 1 Over-allocated | Actively manage the tagged resource when the resource manager requires more high-performance hardware |
| Error State Threshold | Actively manage the tagged resource when a certain portion of currently managed resources are in an error state |
| x86 Platform | Actively manage the tagged resource when demand for x86 computation platforms is high |
| Peak Time | Actively manage the tagged resource during a given time period of peak computation demand |
| Geography | Actively manage the tagged resource if more compute resources for the particular geographical location are needed |

FIG. 3 illustrates a graphical user interface (GUI) 300 for tagging resources, according to one embodiment described herein. In one embodiment, the GUI 300 is used by the resource manager to enable the system administrator to tag the different IT resources. The GUI 300 includes two charts 305, 310 that list resources that have not been previously identified by the resource manager. For example, the information about the new resources (e.g., name and type) may be provided by the system administrator or when the resource manager performed a scan of the virtual environment. As shown, chart 305 includes a list of new virtualization and hardware managers while chart 310 lists new hardware resources.

In chart 305, each resource is assigned a name, type, and metadata tags. The system administrator can enter these values manually or they may have been pre-populated by the resource manager. In one embodiment, the tags are not assigned by the resource manager. In this case, the system administrator may add one or more tags in the column labeled "Metadata Tags" thereby associating activation conditions with the different resources. As will be discussed in more detail below, the activation condition is used by the resource manager to determine when to begin to actively manage the resource so that the resources can be assigned to a workload or reassigned to a different workload.

The three resources listed in chart 305 include two virtualization managers (pvc1.ibm.com and pvc2.ibm.com) and one hardware manager (phc1.ibm.com). The resources can have any number of tags or even no tags if the system administrator does not want the resource manager to automatically determine when to manage the resource. As shown here, the first virtualization manager is tagged with US to indicate, for example, its geographic location where it is executing or the geographic location of the cluster the manager is monitoring. The virtualization manager is also tagged with MAINTENANCE which, as described in Table 1, means the resource should be actively managed by the resource manager when a maintenance operation is being performed or about to be performed. The second virtualization manager is tagged as UK to indicate its associated geographic location as well as PEAK TIME to indicate the resource should be actively managed during times when the computation demands on the virtual environment is at a peak. Chart 305 also includes a hardware manager (phc1.ibm.com) which is assigned only one metadata tag that is associated with the geographic location of the manager or the location of the hardware resource managed by the hardware manager.

Chart 310 lists three hardware resources. The first two hardware resources are computing hardware resources (e.g., servers or blades) while the third is a data storage resource. The first hardware resource (pNode1) is tagged with the tags US and ERROR BACKUP. As shown in Table 1, the error backup tag means that pNode1 may be actively managed by the resource manager when a certain number of the currently managed resources are in an error state. For example, if the resource manager determines that one or more servers are malfunctioning, the resource manager may activate pNode1 and assign it to the workload with the malfunctioning servers. The second hardware resource (pNode2) includes only one tag which indicates the pNode2 is actively managed when additional computer resources that execute the x86 platform are needed. The third hardware resource (vController) may be actively managed when there is a need for extra data storage in the UK or when demand for the computing resources in the virtual environment is at a peak.

In one embodiment, the system administrator can add new tags (and corresponding activation conditions) which are recognized by the resource manager. In this manner, the list of possible tags can adapt to changing needs in the virtual environment. For example, the system administrator may realize that a virtual machine that executes a certain application is best suited for handling a particular workload. The system administrator may then create a new tag and activation condition based on this correlation. The system administrator (or the resource manager) can then assign the new tag to the virtual machines that execute the application.

FIG. 3 is just one example of a suitable graphical user interface 300 that can be displayed to the system administrator. For example, in another embodiment, the virtual/hardware managers may be included in the same chart as the hardware resources rather than being in two separate charts as shown. Moreover, the user interface 300 may include additional information about the IT resources than what is shown in charts 305 and 310.

Returning to method 200 in FIG. 2, at block 215 the resource manager stores the tags and a resource identifier as an entry in a data store. The data store can be any organized data repository that permits the resource manager to then scan the entries. The data store may be a relational database, file system, table, spreadsheet, etc. Moreover, the data store may include resources that are actively managed by the resource manager along with those that are not currently being managed.

At block 220, the resource manager determines if a condition corresponding to the tags is currently satisfied. Stated differently, after a new resource is identified and tagged in blocks 205-215, the resource manager determines if it should be actively managed. At block 225, if the current state of the virtual environment matches one of the conditions associated with the tags, the resource manager begins to actively manage the resource. Using chart 305 in FIG. 3 as an example, if the virtual environment is performing maintenance on resources in the US, the resource manager may begin to actively manage the new virtualization manager pvc1.ibm.com since the condition matches its tags. In contrast, if the virtual environment is not experiencing a peak time, then at block 235 the resource manager would decide not to actively manage the new virtualization manger pvc2.ibm.com. Even if the resource manager decides not to actively manage a new resource, the information about the resource may be still stored in the data store so that the resource can be actively managed if a later event in the virtual environment has conditions matching the tags of a resource. Of course, if a resource is tagged ALWAYS, the resource manager will automatically begin to actively manage the resource without determining whether any condition is satisfied.

In one embodiment, the resource manager actively manages the resource at block 220 only if all the tags satisfy the current conditions of the virtual environment. For example, the resource manager actively manages virtualization manager pvc1.ibm.com if the virtual environment is performing maintenance on resources in the US which are conditions that match the US and MAINTENANCE tags. If any condition is not satisfied, the resource manager does not begin to actively manage the resource. For instance, if the virtual environment is performing maintenance in the UK, pvc1.ibm.com would not be actively managed when added into the data store. Alternatively, the resource manager may consider the tags independently of each other. For example, so long as the state or condition of the virtual environment matches at least one tag, then the resource is actively managed. Furthermore, in one embodiment, the system administrator may set a flag when adding each new resource to indicate if multiple tags assigned to the same resource should be considered independently or collectively when determining whether to actively manage the resource. As such, some resources may require the tags assigned to a resource to satisfy all the conditions while other resources may require only one (or a subset) of the tags to match a condition of the virtual environment.

When actively managing a resource, the resource manager may provide updates to the resource, ping the resource to determine its status (e.g., functional or non-functional), handle error messages from the resources, and the like. Actively managing a resource, however, requires compute resources and places a burden on the resource manager. As virtual environment grow to include more resources, the bandwidth and compute resources assigned to the resource manager must also grow. Advantageously, method 200 provides a technique where the number of actively managed resources in the virtual environment is reduced. That is, by tagging the resources and using associated conditions to determine whether to actively manage the resource, the amount of work performed by the resource manager is reduced relative to a virtual environment where the resource manager actively manages all of the resources. Instead, at block 220, when a new resource is added to the virtual environment, the resource manager determines based on the tag and the current state of the virtual environment whether to actively manage the resource or not. If so, at block 225 the resource manager designates the resource as consumable, and at block 230, the manager assigns the resource to a workload in the virtual environment. If not, at block 235 the resource manager does not mange the new resource but may decide otherwise at a later time which is described in FIG. 4.

If the resource manager determines not to actively manage the newly added resources, this does not necessarily mean the resource is idle—i.e., is not used to perform a computational task. For example, the resource may be used to perform a function in the virtual environment which does not require it to be actively managed by the resource manager. Alternatively, the new resource may currently be allocated to a different virtual environment. Nonetheless, because the resource is tagged and stored in the data store, the resource manager is aware of the resource. Even though the resource is assigned to a different virtual environment, the resource manager can then send a request to borrow the resource when a need arises that matches the condition associated with the resource's tag. In this manner, the data store can include resources that are not actively managed but are still being used in the virtual environment or a different virtual environment.

Figure 4:
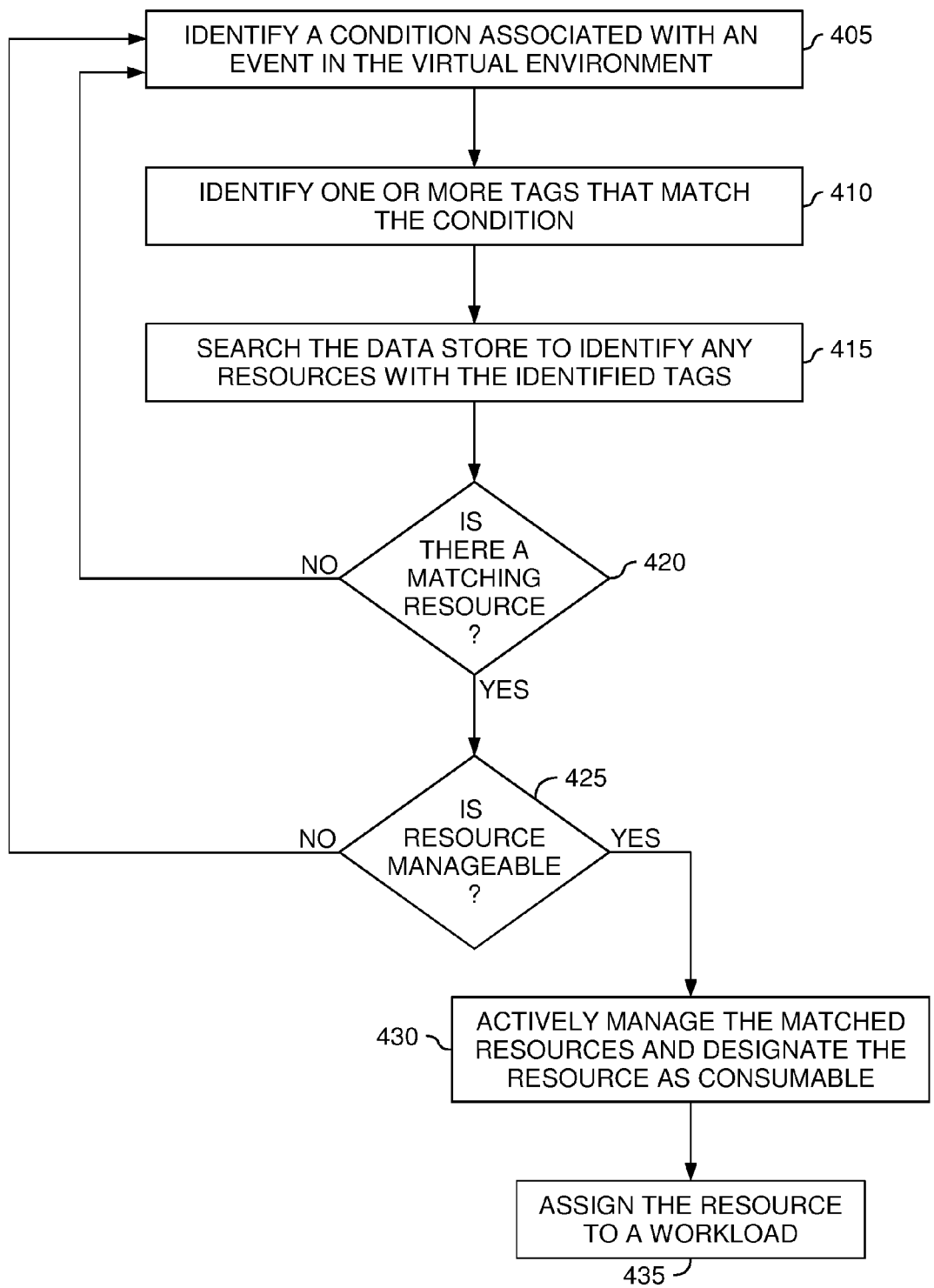
FIG. 4 illustrates a flowchart for identifying resources to actively manage based on metadata tags assigned to the resources, according to one embodiment described herein.

FIG. 4 illustrates a flowchart 400 for identifying resources to actively manage based on metadata tags assigned to the resources, according to one embodiment described herein. At block 405, the resource manager identifies conditions associated with an event in the virtual environment. The event may be a maintenance event, a failure of a hardware resource, a utilization rate falling below or exceeding a threshold, a client request, adding new workloads to the virtual environment for a new client, and the like. The resource manager may characterize the event to identify conditions associated with the event. For example, the resource manager may monitor the number of errors generated by a particular resource, determine the geographic location of a resource that has failed, label the event based on the predefined activation conditions, and the like. At block 410, the identified condition is matched to one or more of the predefined tags. For instance, performing a certain maintenance operation may be associated with one or more conditions that match the MAINTENANCE tag, or receiving an indication that a workload needs additional x86 compute resources may match the x86 PLATFORM tag. Moreover, an event may be associated with multiple conditions, and thus, multiple tags. For example, the event may be associated with a particular geographic region (e.g., the UK) and that the compute resources in that region are over-utilized. In response, the resource manager may identify two tags—e.g., the UK tag and TIER 1 OVER-ALLOCATED tag—that satisfy the conditions of the event.

Once the tags are identified, at block 415, the resource manager searches the data store generated using method 200 in FIG. 2 to identify resources that were assigned the tags. The embodiments herein are not limited to any particular search technique and the technique used may vary depending on the type of data store used to store the resource identifier and metadata tags. Regardless of the technique used, the resource manager searches the data store to identify one or more resources in the data store that are assigned to the tags that match the event's conditions.

At block 420, the resource manager determines if there are any resources in the data store with the requested tag or tags. In one embodiment, the resource manager may select a resource so long as one of its tags matches a tag identified in block 410. Alternatively, the resource manager may select a resource only if all the resource's tags match the event's conditions. In one embodiment, the resource manager may first determine if there is a resource that has all the tags that match the event's conditions. For example, if both tags "UK" and "TIER 1 OVER-ALLOCATED" are the tags identified at block 410, the resource manager first determines if there is a resource that has both of these tags. If so, then that resource (or resources) is selected. If not, the resource manager determines if there is a resource that has at least one of these tags. For example, no resource may be tagged with both UK and TIER 1 OVER-ALLOCATED, but the resource manager may identify a resource that is tagged either TIER 1 OVER-ALLOCATED or UK.

Furthermore, the different tags or different resources may be given different weights or priorities. For example, it may be more important that a resource is tagged TIER 1 OVER-ALLOCATED than having the correct geographic location tag—e.g., UK. As such, if there are no resources that have both these tags, the resource manager may first look for a resource that is tagged TIER 1 OVER-ALLOCATED before selecting a resource that is tagged UK. Moreover, if multiple resources have the same tag or tags—e.g., multiple resources are tagged TIER 1 OVER-ALLOCATED and UK—the resource manager may use selection criteria to determine which resource should be selected (assuming that all of them should not be selected). The selection criteria may be the current utilization of the resources, if the resource is already being actively managed by the resource manager, a predefined priority score that the resource manager or system administrator assigns to the resources, and the like.

If there is at least one resource that has tags matching the conditions of the event, method 400 proceeds to block 425, but if not, the method returns to block 405. At block 425, the resource manager determines if the selected resource or resources are available. Because the resource manager may not be actively managing the selected resource, the manager contacts the resource to determine if the resource can be actively managed. For example, between the time after the tagged resource was added to the data store and when the resource manager decides to actively manage the resource, it may have been powered off or de-allocated such that the resource is not available. Or the resource may currently be used by a different virtual environment that does not want to loan the resource.

In one embodiment, the resource manager uses a brokering process to determine if the resource is manageable. In this scenario, the resource manager may conduct negotiations with a resource manager of a different virtual environment or any other application that is currently managing the resource. During the brokering process, the resource manager may establish terms for borrowing the resource such as a lease duration. If the brokering process is successful, the resource manager determines the resource is manageable. Moreover, once the lease duration expires (assuming there is one), the resource manager may determine the resource is no longer manageable and cease actively managing the matched resource.

If the resource is manageable, at block 430, the resource manager begins to actively manage the resource. If not, method 400 returns to block 405. At block 430, the resource manager may use the information stored in the data store to actively manage the matched resource or resources. That is, the IP address, sign on information, management credentials, location of the resource, and the like may be stored in the data store along with the metadata tags. The resource manager can use this information to manage the resource such that the resource becomes consumable—i.e., the resource can be allocated to a workload in the virtual environment. As discussed previously, actively managing the resource may entail the resource manager periodically pinging the resource, receiving status updates, handling error messages, updating the resource, and the like.

At block 435, the resource manager assigns the resource to a workload in the virtual environment. In one embodiment, the workload assigns the resource to the workload that generates the event identified at block 405. For example, the workload may be undergoing maintenance or need additional x86 computational resources. As such, resources tagged with MAINTENANCE or x86 PLATFORM may be assigned to the workload. In this manner, the resource manager identifies events and automatically assigns appropriately tagged resources to resolve an issue or problem associated with the events.

In one embodiment, the resource manager may use the tags in order to determine when to stop actively managing a resource. For instance, other events (e.g., de-allocation events) may be used to determine when to cease actively managing resources such as a decrease in demand for computing resources by a workload, stopping a workload, completion of maintenance, and the like. In one example, if a resource was actively managed because a hardware resource was undergoing maintenance, once that maintenance is complete, the resource manager may stop actively managing all the resources tagged "MAINTENANCE." Similarly, if a workload is removed from the virtual environment, the resource allocated to that workload tagged "TIER 1 OVER-ALLOCATED" may no longer be managed.

Figure 5:
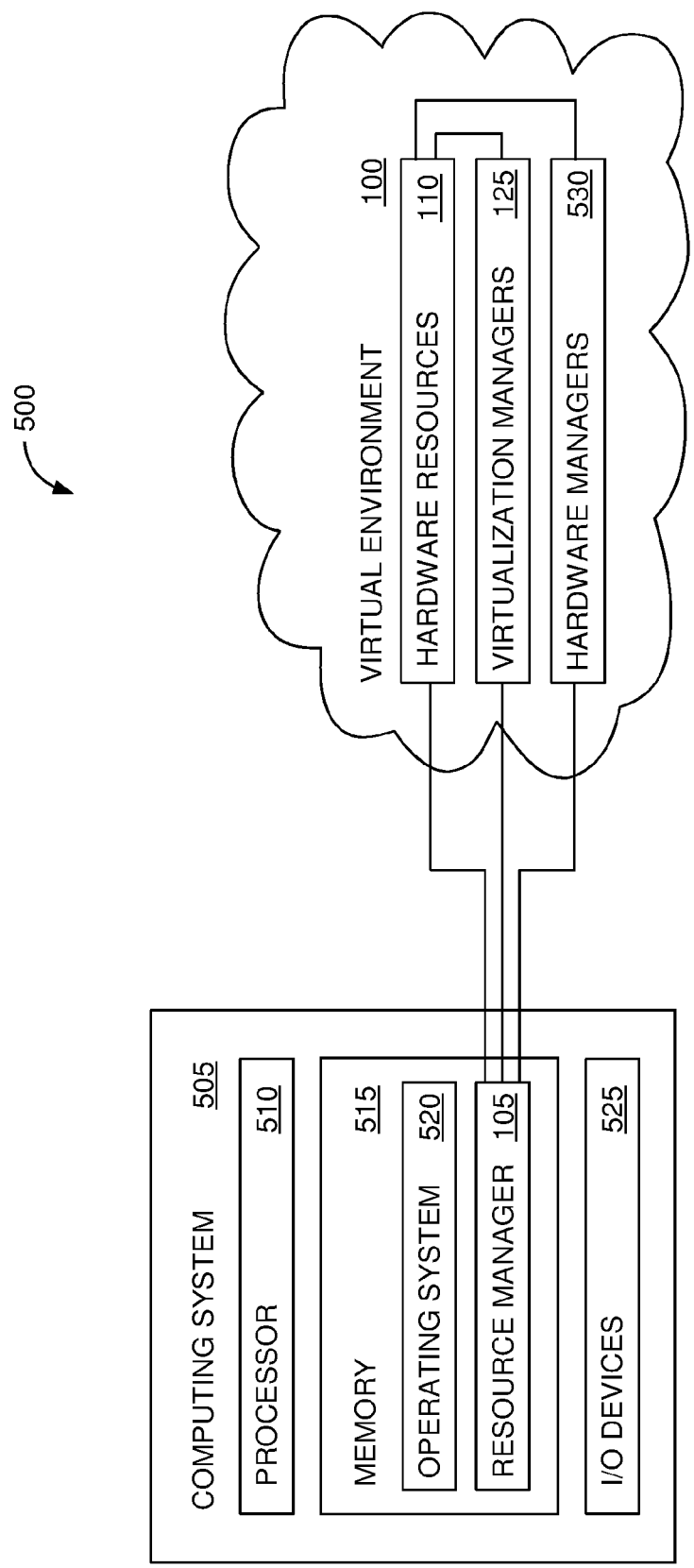
FIG. 5 illustrates a computing device executing the resource manager, according to one embodiment described herein.

FIG. 5 illustrates a computing system 500 executing the resource manager, according to one embodiment described herein. As shown, the computing system 500 includes a processor 510, memory 515, and I/O devices 525. The processor 510 represents any number of individual processing element which each may have one or more processing cores. Memory 515 may include volatile and/or non-volatile memory elements. Here, memory 515 includes an operating system 520 and the resource manager 105. The operating system may be any operating system capable of performing the functions described herein. The resource manager 105 is shown here as an application stored in memory 515 but in other embodiments may include hardware and or firmware. Moreover, as the overhead of the resource manager 105 increases (e.g., the number of actively managed resources increases), additional memory 515 and processing power may be assigned to the computing system 505.

The resource manager 105 is coupled to the hardware resources 110, virtualization managers 125, and hardware managers 530 in the virtual environment 100. As discussed above, the resource manager 105 may use methods 200 and 400 to determine which of these resources 110, 125, 530 to actively manage. Moreover, the resource manager 105 can use a data store, which associates each resource with one or more tags, to determine when to actively manage resource or when to stop actively managing resources. In this manner, the overhead of the resource manager 105 can be reduced relative to a technique that requires the resource manager to actively manage all the resource in the virtual environment 100. Furthermore, by tagging the resource and associating at least one condition with each tag, the resource manager can decide to manage (or to stop managing) a resource automatically—i.e., without user input. For example, once a resource has been tagged and stored in the data store, the resource manager can decide when to begin actively managing the resource without waiting for a prompt from a system administrator.

The I/O devices 525 may include a display screen and input devices such as keyboard, mouse, touchpad, and the like which permit a user (e.g., a system administrator) to access and configure the resource manager 105. For example, the system administrator may use the I/O devices 525 to assign the tags to a new resource that is added to the virtual environment.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud which execute using the resource managed by the resource manager.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A system, comprising:
a computer processor; and a memory containing a program that, when executed on the computer processor, performs an operation for assigning one or more information technology (IT) resources based on an event occurring in a virtual environment, wherein the IT resources perform tasks corresponding to workloads in the virtual environment, the operation comprising: identifying a predefined tag that satisfies a condition associated with the event; searching a data store automatically to identify one or more IT resources assigned the predefined tag, wherein the data store includes a plurality of IT resources that are each assigned at least one predefined tag and are not currently being actively managed by a resource manager of the virtual environment, wherein the resource manager monitors the IT resources in the virtual environment;
after identifying the one or more IT resources assigned the predefined tag and not currently being actively managed by the resource manager and upon determining during a brokering process that the one or more identified IT resources are available and consumable by the virtual environment, actively managing the identified one or more IT resources using the resource manager, wherein before the one or more identified IT resources are actively managed by the resource manager, the one or more identified resources perform computational tasks for the virtual environment or a different virtual environment; and assigning the identified one or more IT resources to a workload in the virtual environment associated with the event.

2. The system of claim 1, wherein the operation further comprises, before searching the data store: identifying the one or more IT resources as a new IT resource for the virtual environment; assigning the predefined tag to the one or more IT resources; and storing one or more identifiers of the one or more IT resources and the predefined tag in the data store.

3. The system of claim 1, wherein the operation further comprises: identifying a de-allocation event occurring in the virtual environment; identifying a different predefined tag that satisfies a condition of the de-allocation event; searching a plurality of actively managed IT resources in the virtual environment to identify an actively managed IT resource assigned the different predefined tag; and ceasing to actively manage the actively managed IT resource using the resource manager.

4. The system of claim 1, wherein the virtual environment is a cloud-based computing environment.

5. The system of claim 1, wherein the operation further comprises, determining the event has occurred in the virtual environment before identifying the predefined tag.

6. The system of claim 1, wherein actively managing the one or more IT resources is selected from the group consisting of providing updates to the one or more IT resource, determine the IT resource's status, and handle error messages.

7. The system of claim 1, wherein the resource manager does not expend resources on IT sources that are not actively managed.

8. A computer program product for assigning one or more information technology (IT) resources based on an event occurring in a virtual environment, wherein the IT resources perform tasks corresponding to workloads in the virtual environment, the computer program product comprising: a computer-readable storage medium having computer-readable program code embodied therewith, the computer-readable program code configured to: identify a predefined tag that satisfies a condition associated with the event; search a data store automatically to identify one or more IT resources assigned the predefined tag, wherein the data store includes a plurality of IT resources that are each assigned at least one predefined tag and are not currently being actively managed by a resource manager of the virtual environment, wherein the resource manager monitors the IT resources in the virtual environment; after identifying the one or more IT resources not currently being actively managed by the resource manager of the virtual environment and upon determining during a brokering process that the one or more identified IT resources are available and consumable by the virtual environment, actively manage the identified one or more IT resources using the resource manager, wherein before the one or more identified resources are actively managed by the resource manager, the one or more identified resources perform computational tasks for the virtual environment or a different virtual environment; and assign the identified one or more IT resources to a workload in the virtual environment associated with the event.

9. The computer program product of claim 8, further comprising computer-readable program code configured to, before searching the data store: identify the one or more IT resources as a new IT resource for the virtual environment; assign the predefined tag to the one or more IT resources; an store one or more identifiers of the one or more IT resources and the predefined tag in the data store.

10. The computer program product of claim 8, further comprising computer-readable program code configured to: identify a de-allocation event occurring in the virtual environment; identify a different predefined tag that satisfies a condition of the de-allocation event; search a plurality of actively managed IT resources in the virtual environment to identify an actively managed IT resource assigned the different predefined tag; and cease actively managing the actively managed IT resource using the resource manager.

11. The computer program product of claim 8, further comprising computer-readable program code configured to determining the event has occurred in the virtual environment before identifying the predefined tag.

12. The computer program product of claim 8, wherein actively managing the one or more IT resources is selected from the group consisting of providing updates to the one or more IT resource, determine the IT resource's status, and handle error messages.

13. The computer program product of claim 8, wherein the resource manager does not expend resources on IT sources that are not actively managed.

* * * * *